April 7, 1931.   L. C. REIS   1,799,179
TAILSTOCK ATTACHMENT FOR LATHES
Filed Jan. 6, 1927
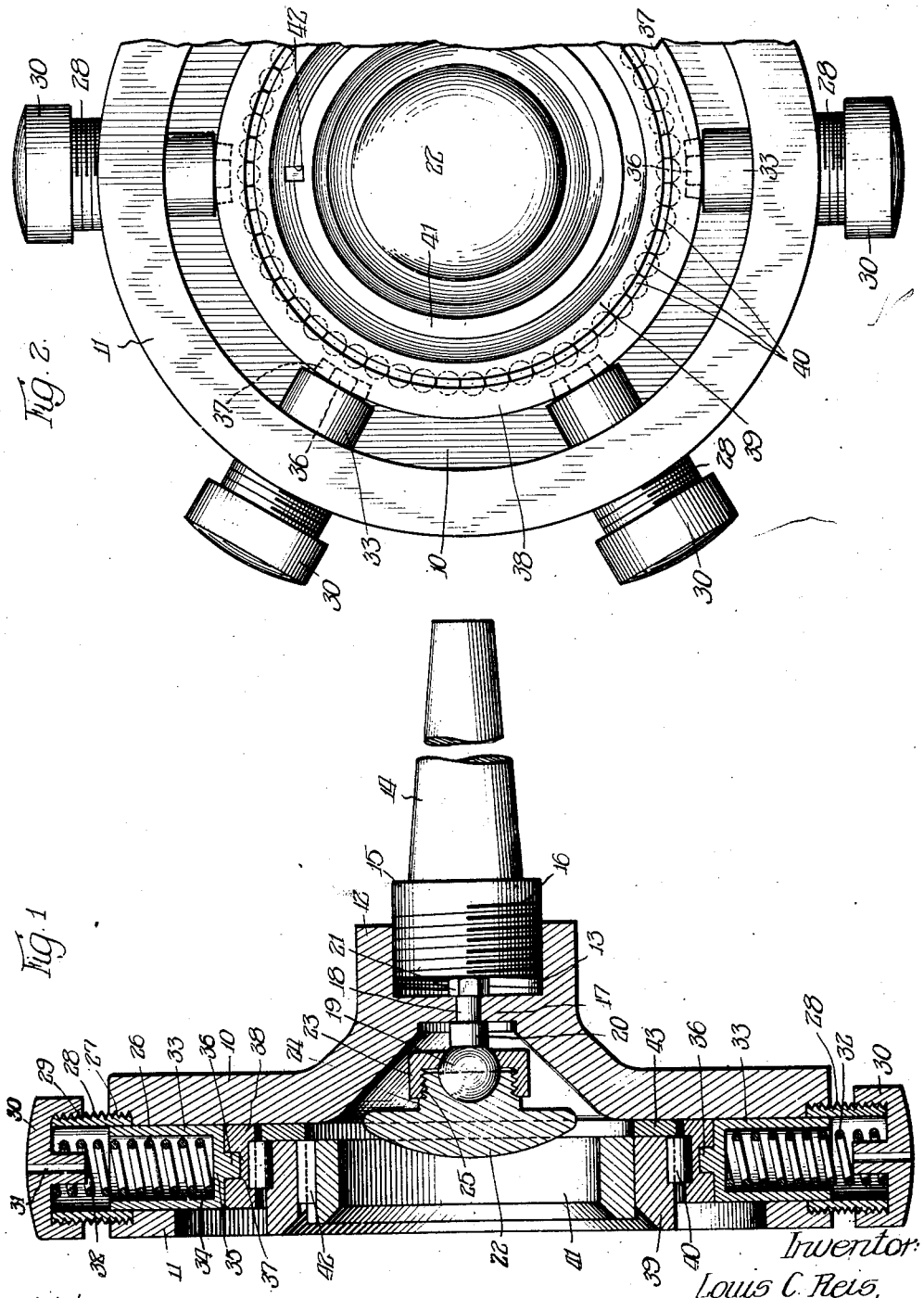
Inventor:
Louis C. Reis,
By D. Anthony Usina
Atty.
Witness:
R. Burkhardt.

Patented Apr. 7, 1931

1,799,179

UNITED STATES PATENT OFFICE

LOUIS C. REIS, OF DULUTH, MINNESOTA

TAILSTOCK ATTACHMENT FOR LATHES

Application filed January 6, 1927. Serial No. 159,352.

This invention relates to a work support and is illustrated herein as embodied in a support which may be used in connection with an ordinary lathe, the better to adapt such lathe for the turning of bent billets to remove a surface layer therefrom without previously straightening the billets.

Billets used for making seamless tubing and other similar articles are formed in a rolling machine from cast ingots and, in some instances, are bent in their process of formation as much as half an inch throughout their length and are also coated with an irregular surface crust and contain in the surface small openings and irregularities. Prior to the formation of the finished article from the billets, it is necessary to peel or remove a certain thickness of the outer surface of the billets in order to remove the irregularities and undesirable crust layer so that when the billet is subsequently pierced, as in the case of forming seamless tubes, the walls of the pipe or other finished articles are free from flaws, weaknesses or irregularities of any kind. The variation from the exact straightness is not great and seldom exceeds half an inch in a billet six to eight feet long, but this is sufficient to render it impossible to turn the billets in a lathe of ordinary structure as there would be a lack of uniformity of cut and a considerable loss of metal. Inasmuch as it would be very expensive to straighten the billets prior to the peeling operation, it is found desirable to provide a means as an attachment for lathes by which billets may be turned on a lathe even though they may be slightly bent, and yet permit a cutting element to remove an outer surface of uniform thickness throughout the entire length of the billet.

To this end, it is one of the purposes of my invention to provide a work support which is adapted to be held by a lathe, having a movable chuck mounted therein providing a holding means for one end of the billet and which is capable of displacement in a plane perpendicular to the axis of rotation.

Another object of my invention is to provide a work support of the type described in the above stated object in which a housing is provided having a plurality of spring pressed elements engaging and centrally locating a rotatably mounted chuck for receiving one end of the billet, and further providing a step in said housing mounted for universal movement for receiving the end thrust of the billet.

A further object of my invention is to provide a chuck mounted in a housing of the above described type, provided with an anti-friction bearing, the outer race ring of which is supported within the housing by a plurality of radially disposed spring elements engaging the race ring but capable of slight rotary movement relative thereto.

Another object of my invention is to provide a work support of the above described type, provided with a tang adapted to fit into and be held in the socket of one of the stocks of an engine lathe of usual structure.

These and other objects are accomplished by means of the arrangement disclosed on the accompanying sheet of drawings, in which—

Figure 1 is a cross sectional side elevation of a work support constructed in accordance with my invention; and Figure 2 is a fragmentary end elevation of the structure shown in Figure 1.

The various novel features of the invention will be apparent from the following description and drawings and will be particularly pointed out in the appended claims.

Referring to the drawings, it will be noted that my invention is illustrated in the form of a work support which comprises a housing 10 having an outer circumferential flange 11 and a centrally positioned hub portion 12 internally threaded as at 13 to receive the tang 14 provided with an enlargement 15 at one end, threaded as at 16 for engagement with the threads in the hub. Separating the inner end of the hub from the general housing opening is a web portion 17 provided with a central opening 18 which is adapted to receive and serve as a mounting for the ball pivot member 19, the stem 20 of which fits through the opening 18 and receives nut 21 to hold the bearing stem in place. A rounded step member 22 is mounted for universal movement on the outer side of the ball pivot 19 and is retained thereon by a cap 23 internally threaded as at 24 to engage threads 25 on the step 22 to lock the parts in assembled relationship, it being understood that the cap member 23 is placed on the stem 20 before the stem is inserted through the opening 18. The circumferential flange 11 of the housing is provided with a plurality of radial openings 26 (in the illustration shown six) which are enlarged and screw threaded at the outer ends as at 27 so as to receive the cylindrical spring housing members 28. The cylindrical housing members are provided with threads 29 on their outer surfaces and have caps 30 threaded to their outer ends to form an abutment and a closing means for the cylindrical spring housings, the cap member being provided with a small vent 31 to admit air to the interior of the cylindrical chamber. It is to be noted that the cylindrical spring housing member 28 has an interior bore of the same diameter as the radial openings 26 through the flange 11 so that a cylinder 32 of uniform diameter is provided in which a hollow piston 33 is adapted to slide. A coiled spring 34 is positioned within the cylinder and abuts at the top with the inner surface of the cap 30 and at the bottom, the end wall 35 of the hollow piston member 33.

At the inner ends of the hollow piston members are provided lugs 36 which fit in slots 37 centrally disposed and circumferentially spaced around the periphery of an outer race ring 38. Located within the outer race ring is an inner race ring 39 which, with the outer race ring and the anti-friction roller elements 40, form an anti-friction bearing for the chuck ring 41. The chuck ring has an inside diameter suitable to receive the piece to be machined and is prevented from rotating relative to the inner race ring 39 by means of the feather or key 42. A retaining ring 43 is positioned between the inner wall of the housing member 10 and one edge of the inner race ring 39, is of greater diameter than said inner race ring, and is fastened thereto by screws or other suitable means whereby it serves to hold the anti-friction rollers 40 in place.

In operation, the work support herein described is mounted in the socket of one of the stocks of a lathe by clamping the tang 14 therein, and the support constructed according to this invention, therefore, may serve to replace the ordinary dead center on the customary engine lathe. When in this position, one end of the billet is placed into the chuck ring 41 with its end abutting the step 22 and then the lathe is set into operation. From this description of the structure, it can be readily understood that in the event the billet is slightly bent, the necessary yielding will occur at the end of the billet held in the work support to cause the removal of an outer layer of metal from said billet of uniform thickness. In view of the fact that the spring elements, which are radially positioned in and circumferentially spaced around the housing, are of uniform strength and are positioned so as to oppose each other, the normal tendency is for the chuck ring 41 to be centered relative to the axis of rotation and consequently, unless the billet is bent to force a bodily movement of the chuck ring in a plane perpendicular to the axis of rotation, the chuck ring will remain centered.

Attention is called to the slots 37 which are necessary to permit the bodily movement of the chuck and race ring in view of the fact that there will always be two lugs 36 projecting into the outer race ring at right angles to the desired movement; consequently, a relative movement at this point must be provided. When the chuck is in operation serving as a mounting for a billet that is slightly bent and the billet is positioned with its end engaging the step 22, the necessary movement occasioned by the chuck and billet during the operation is provided for by the rounded outer surface of the step 22 at the point of engagement with the billet, and further, by the ball and socket connection between the step 22 and the stem 20, which permits a universal movement.

I claim:

1. A work support comprising a housing, a chuck, and means mounting said chuck for unconfined rotation relative to said housing, and permitting said chuck to float, so as to rotate around centers eccentric to the center of said housing.

2. A work support comprising a stationary housing, a normally rotatable chuck, and means mounting said chuck for normal bodily movement in said housing.

3. A work support comprising a stationary housing, a normally rotatable chuck, and means mounting said chuck for normal bodily movement in said housing.

4. A work support comprising a stationary housing, a rotatable chuck provided with an inner race ring, an outer race ring mounted for bodily movement in said housing, and anti-friction bearing means mounted between said inner and outer race rings.

5. A work support comprising a stationary housing, a rotatable chuck and a swiveled step, an inner race ring fixed on said chuck, an outer race ring mounted for bodily movement in said housing, and anti-friction bearing means mounted between said inner and outer race rings.

6. A work support comprising a housing, a rotatable chuck provided with an anti-friction bearing having inner and outer race rings, and means for mounting said outer race ring in said housing comprising a plurality of radially disposed yielding elements engaging said outer race ring with freedom for slight circumferential movement relative thereto.

7. A work support comprising a housing, a rotatable chuck provided with an anti-friction bearing having inner and outer race rings, and means for yieldingly mounting said outer race ring in said housing comprising a plurality of radially disposed yielding elements engaging said outer race ring with slight circumferential movement relative thereto, said housing being provided with adjustable means to vary the force exerted by said yielding elements.

8. A work support comprising a housing, a rotatable chuck provided with an anti-friction bearing having inner and outer race rings, and means for yieldingly mounting said outer race ring in said housing comprising a plurality of radially disposed spring-pressed elements engaging said outer race ring with slight circumferential movement relative thereto, and a step in said housing.

9. A work support comprising a housing, a rotatable chuck provided with an anti-friction bearing having inner and outer race rings, and means for yieldingly mounting said outer race ring in said housing comprising a plurality of radially disposed spring-pressed elements engaging said outer race ring with slight circumferential movement relative thereto, and a step universally mounted in said housing.

10. A work support comprising a stationary housing, a rotatable chuck provided with an anti-friction bearing having inner and outer race rings, and means for yieldingly mounting said outer race ring in said housing comprising radially disposed spring elements interposed between said outer race ring and said housing.

11. A work support comprising a stationary housing, a rotatable chuck provided with a bearing having inner and outer bearing elements, and means for resiliently mounting said outer bearing element in said housing comprising radially disposed spring elements interposed between said outer bearing element and said housing.

12. A work support, comprising, in combination, a housing and a chuck mounted within the housing for free rotary movement with respect thereto and for normally limited bodily movement with respect thereto.

Signed at Duluth, Minnesota, this 31st day of Dec., 1931.

LOUIS C. REIS.